United States Patent [19]
Lee

[11] Patent Number: 5,574,481
[45] Date of Patent: Nov. 12, 1996

[54] DETACHABLE FOLDING KEYBOARD DEVICE

[75] Inventor: Michael Lee, Taipei, Taiwan

[73] Assignee: Silitek Corporation, Taipei, Taiwan

[21] Appl. No.: 188,845

[22] Filed: Jan. 31, 1994

[51] Int. Cl.[6] .................................................. G09G 3/02
[52] U.S. Cl. ........................... 345/168; 400/472; 341/22
[58] Field of Search ................................ 345/168, 169;
341/22, 23; 400/682, 488, 489, 492, 472,
82, 681; 379/370

[56] References Cited

U.S. PATENT DOCUMENTS 4,018,998  4/1977  Wegner .................... 379/370

FOREIGN PATENT DOCUMENTS

| 4108096 | 9/1992 | Germany | 400/472 |
| 9200851 | 1/1992 | WIPO | 400/682 |
| 9301054 | 1/1993 | WIPO | 400/489 |

*Primary Examiner*—Ulysses Weldon
*Assistant Examiner*—Regina Liang
*Attorney, Agent, or Firm*—Browdy and Neimark

[57] ABSTRACT

A detachable folding keyboard device includes a base frame unit consisted of a left base frame and a right base frame, a keyboard unit consisted of a left keyboard and a right keyboard respectively supported on the left and right base frames, connecting devices connected between the left and right frames for permitting the left and right keyboards to be end matched, or to be set apart and spread out like a fan, or to be folded up.

3 Claims, 7 Drawing Sheets

5,574,481

DETACHABLE FOLDING KEYBOARD DEVICE

BACKGROUND OF THE INVENTION

The present invention relates to a detachable folding keyboard device which consists of two opposite parts that can be set apart and turned to change the angle relative to each other and that can be folded up when not in use.

A variety of electronic apparatus are widely used in different fields and operated by keyboards. More particularly, the keyboard is one of the requisite parts of a computer system for data input. A conventional keyboard is not detachable, and therefore it needs much operation space. Because the key switches of the keyboard of a notebook computer is made small, it is not easy to operate the key switches by both hands. Furthermore, because the keyboard is not detachable, the operator must adapt oneself to the keyboard during the operation, causing the spine to ache easily.

SUMMARY OF THE INVENTION

The present invention has been accomplished under the aforesaid circumstances. It is therefore an object of the present invention to provide a keyboard device for a computer system which is detachable. It is another object of the present invention to provide a detachable folding keyboard device which consists of two opposite parts that can be set apart and spread out like a fan. It is still another object of the present invention to provide a detachable folding keyboard device which consists of two opposite parts that can be folded up when not in use. It is still another object of the present invention to provide a detachable folding keyboard which is simple in structure and inexpensive to manufacture.

According to one aspect of the present invention, the detachable folding keyboard device comprises a base frame unit consisted of a left base frame and a right base frame, a keyboard unit consisted of a left keyboard and a right keyboard respectively supported on the left and right base frames, connecting devices connected between the left and right frames for permitting the left and right keyboards to be end matched, or to be set apart and spread out like a fan, or to be folded up.

According to another aspect of the present invention, the left and right keyboards of the keyboard unit have respective upright rods at respective outer corners, wherein the upright rods on the left keyboard are respectively stopped against the upright rods on the right keyboard when the keyboard device is folded up, and therefore the key switches of the left and right keyboards are prohibited from being squeezed.

DETAILED DESCRIPTION OF THE PREFERRED EMBODIMENT

Figure 1:
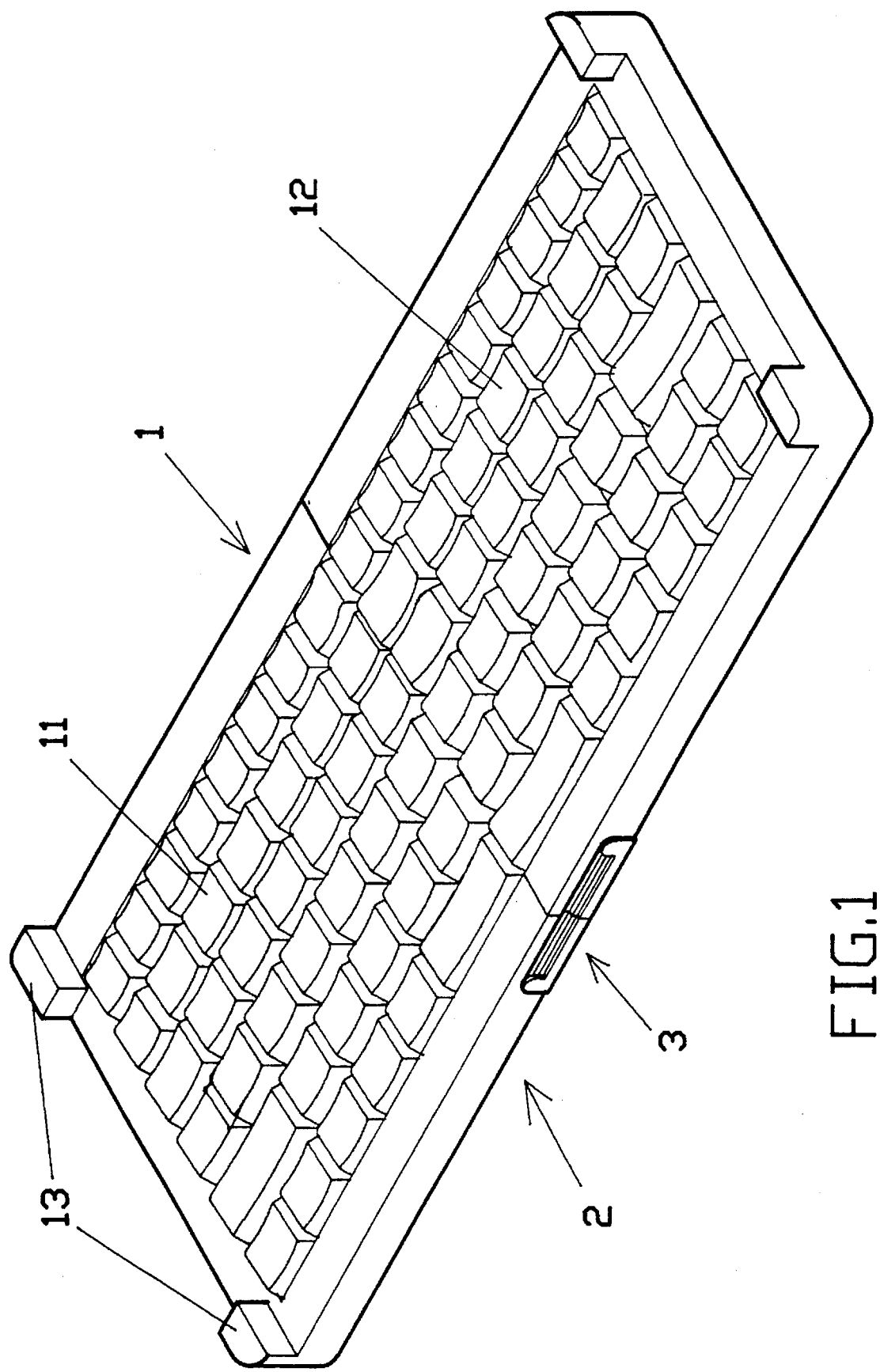
FIG. 1 is an elevational view of a detachable folding keyboard device according to the preferred embodiment of the present invention.
Figure 2:
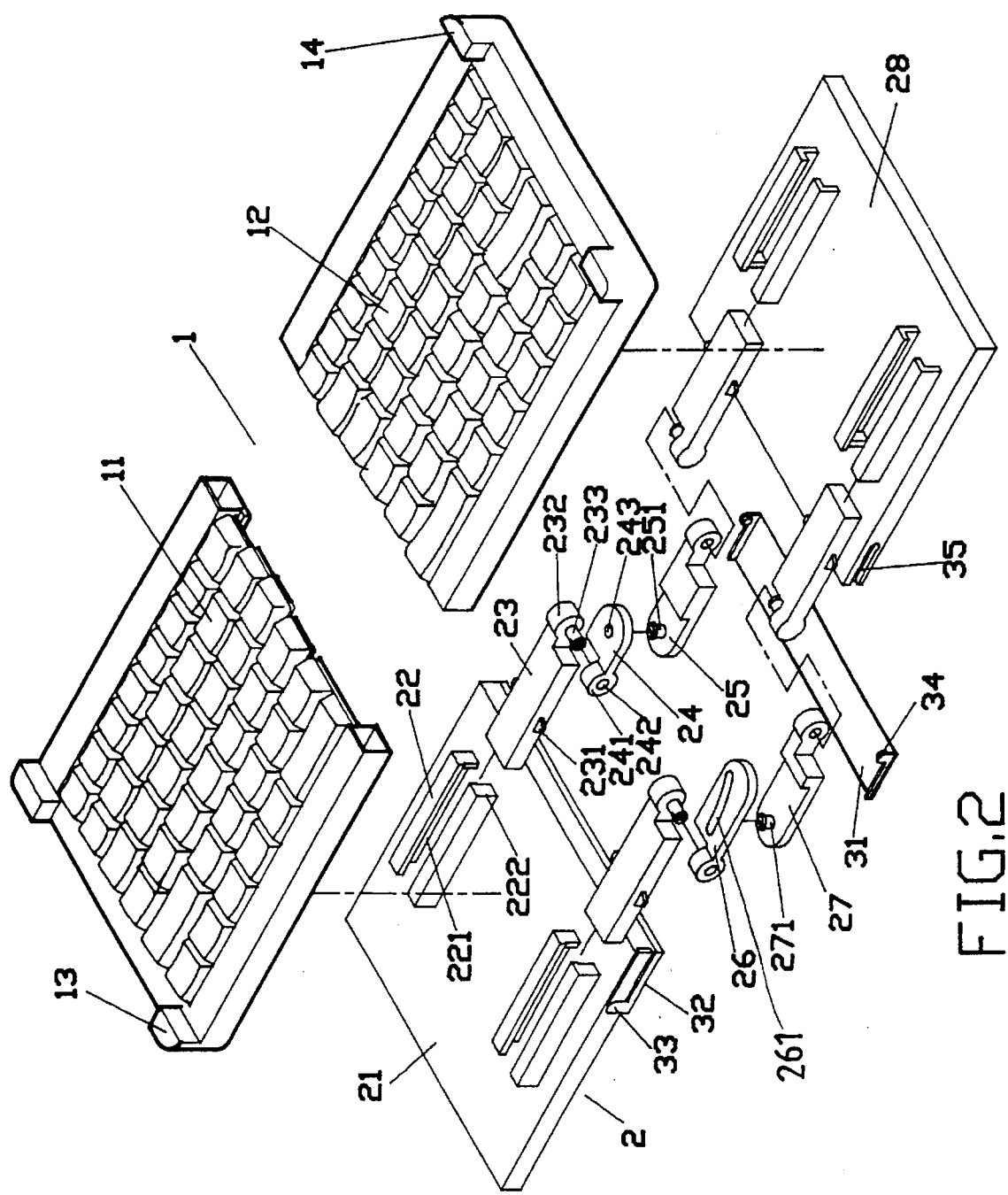
FIG. 2 is an exploded view of the detachable folding keyboard device shown in FIG. 1.
Figure 3:
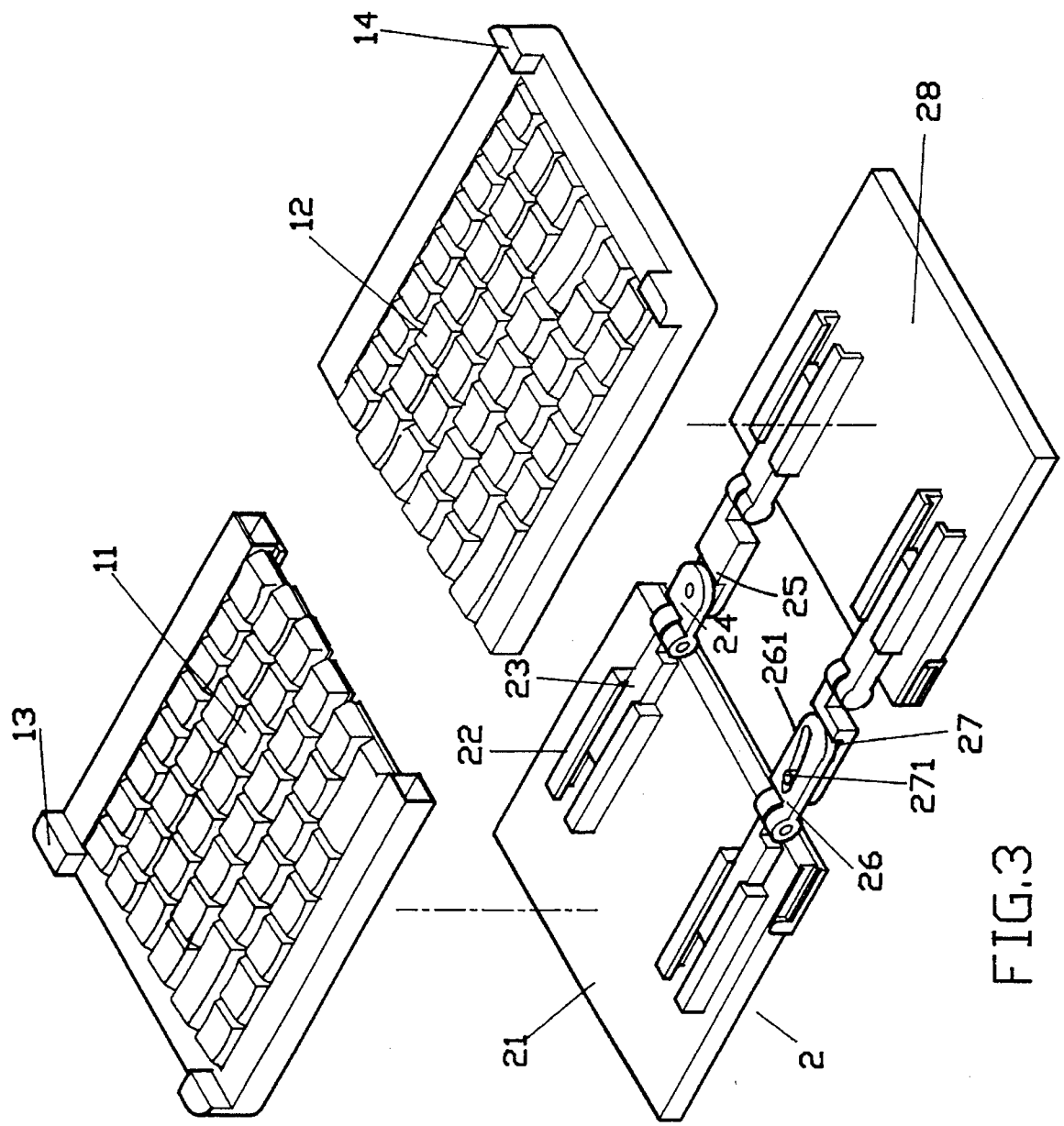
FIG. 3 shows the base frame unit of the detachable folding keyboard of FIG. 1 assembled.

Referring to FIGS. 1, 2, and 3, a detachable folding keyboard device 1 is shown comprised of a left keyboard 11, a right keyboard 12, a base frame unit 2, and a lateral cover plate unit 3.

The left and right keyboards 11;12 have respective upright rods 13;14 at respective outer corners. When the left and right keyboards 11;12 are folded up, the upright rods 13 on the left keyboard 11 are respectively stopped against the upright rods 14 on the right keyboard 12, and therefore a space is maintained between the key switches on the left keyboard 11 and the key switches on the right keyboard 12.

The base frame unit 2 is comprised of a left base frame 21 and a right base frame 28 fitting under the left keyboard 11 and the right keyboard 12 respectively. The left and right base frames 21;28 have each two pairs of parallel rails 22, each pair of parallel rails 22 defining a sliding groove 221. Projecting stop strips 222 are respectively made inside either pair of parallel rails 22. A respective slide bar 23 is made to slide in the sliding groove 221 of either pair of parallel rails 22, having two stub rods 231 at two opposite sides. When the slide bar 23 is moved outwards, the stub rods 231 will be stopped against the projecting stop strips 222, and therefore the slide bar 23 will not disconnect from the respective pair of parallel rails 22. The slide bars 23 on the left base frame 21 are respectively connected to the slide bars 23 on the right base frame 28 by connecting plates, namely, the first connecting plate 24, the second connecting plate 25, the third connecting plate 26, and the fourth connecting plate 27. The slide bars 23 on the left base frame 21 have a respective outer end 232 terminated in a barrel 233. The first connecting plate 24 has one end 243 terminated in a barrel 242 connected to the barrel 233 on one slide bar 23 on the left base frame 21 by a pintle (not shown), and therefore the slide bar 23 and the first connecting plate 24 form a hinge. The first connecting plate 24 further comprises a pivot hole 243 on an opposite end thereof. The second connecting plate 25 has a pivot 251 at one end fitted into the pivot hole 243 on the first connecting plate 24, and an opposite end hinged to the corresponding slide bar 23 on the right base frame 28. The third connecting plate 26 has one end hinged to the other slide bar 23 on the left base frame 21 and comprises an elongated, curved slot 261 to hold the fourth connecting plate 27. The fourth connecting plate 27 has a pivot pin 271 at one end inserted into the curved slot 261 on the third connecting plate 26. The opposite end of the fourth connecting plate 27 is hinged to the other slide bar 23 on the right base frame 28.

Figure 8:
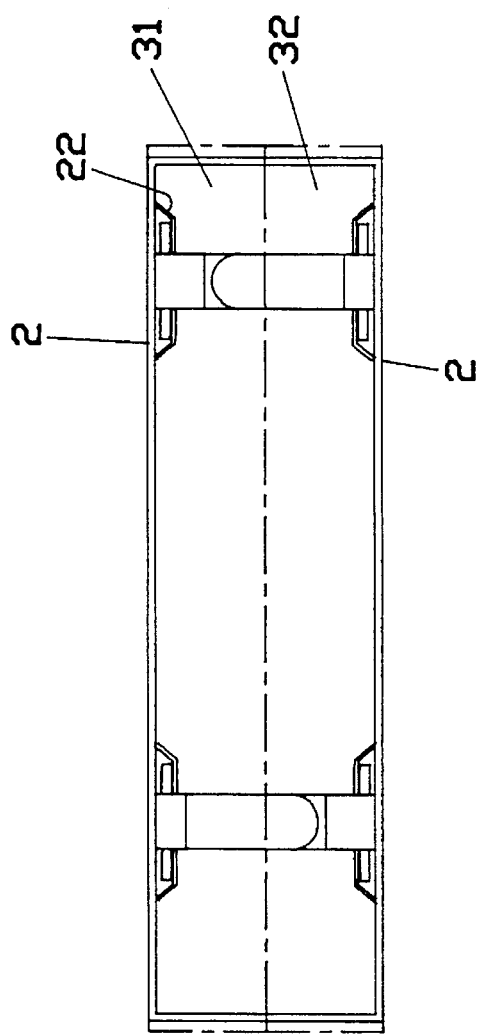
FIG. 8 shows the detachable folding keyboard device of FIG. 1 folded up.
Figure 9:
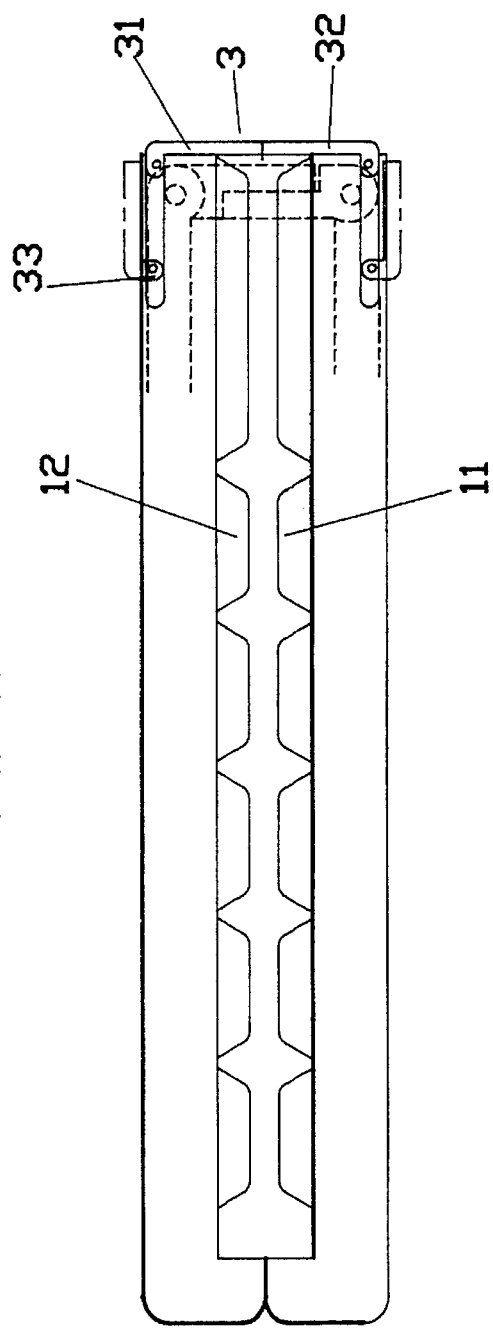
FIG. 9 shows the detachable folding keyboard device of FIG. 1 folded up and the lateral cover plate unit thereof moved from the horizontal position to the vertical position covered on the collapsed keyboard device at one side.

As shown in FIGS. 2, 8, and 9, the lateral cover plate unit 3 comprises a left cover plate 32 and a right cover plate 31. Each cover plate 31 or 32 comprises two upward bearing walls 33 at two opposite ends terminating in a respective sliding rod 34 moved to slide in a respective sliding way 35 on either base frame 21 or 28.

Figure 4:
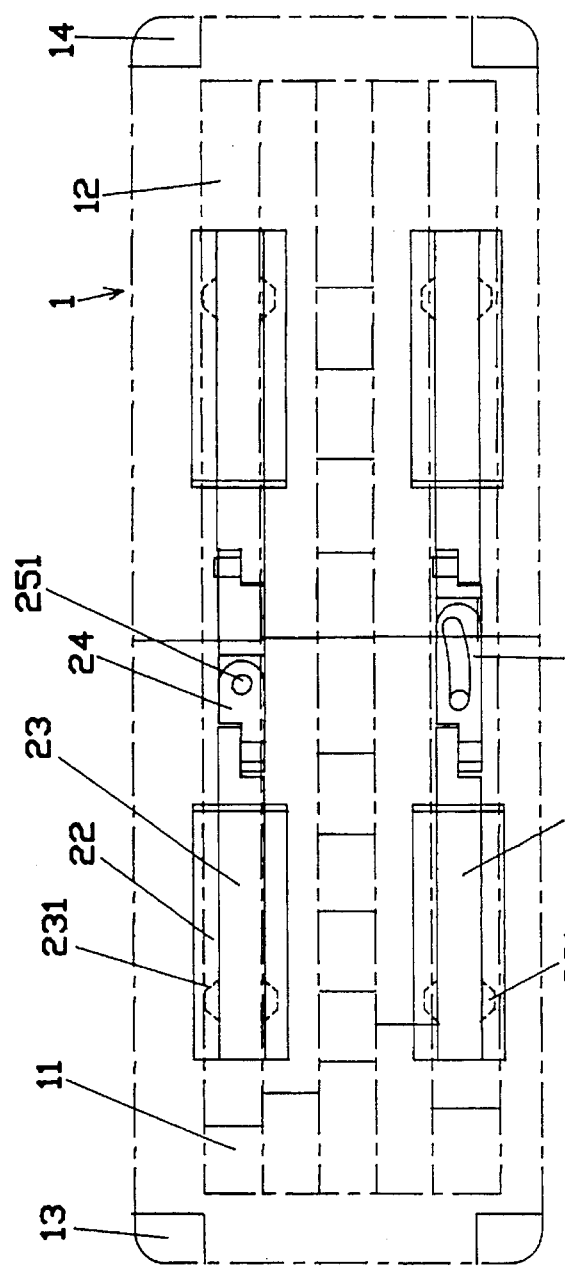
FIG. 4 is a top view in plain of the detachable folding keyboard device shown in FIG. 1.
Figure 5:
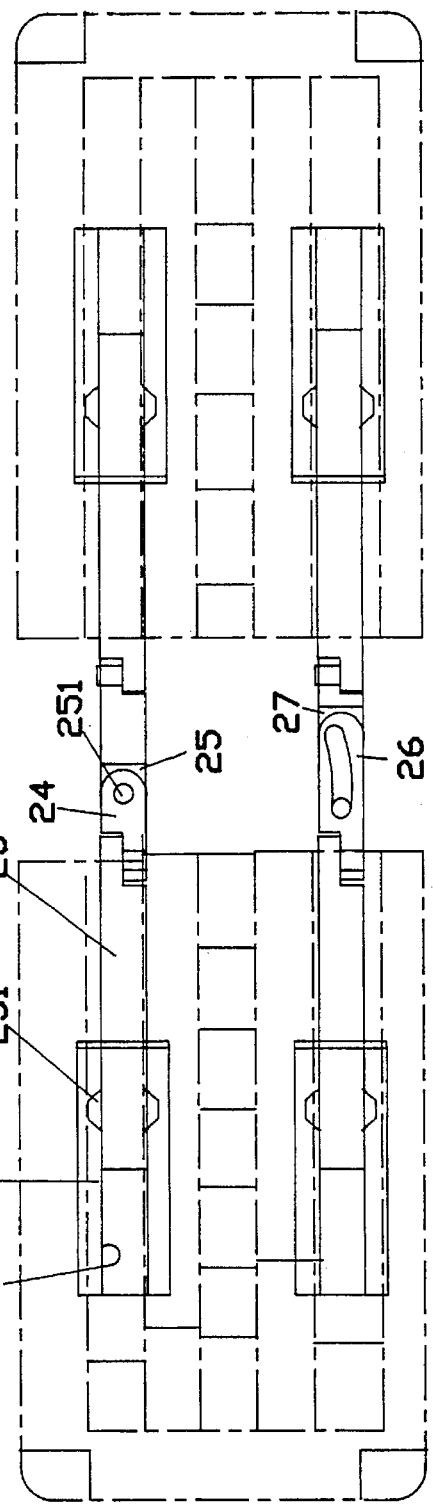
FIG. 5 is similar to FIG. 4 but showing the left and right keyboards set apart.
Figure 6:
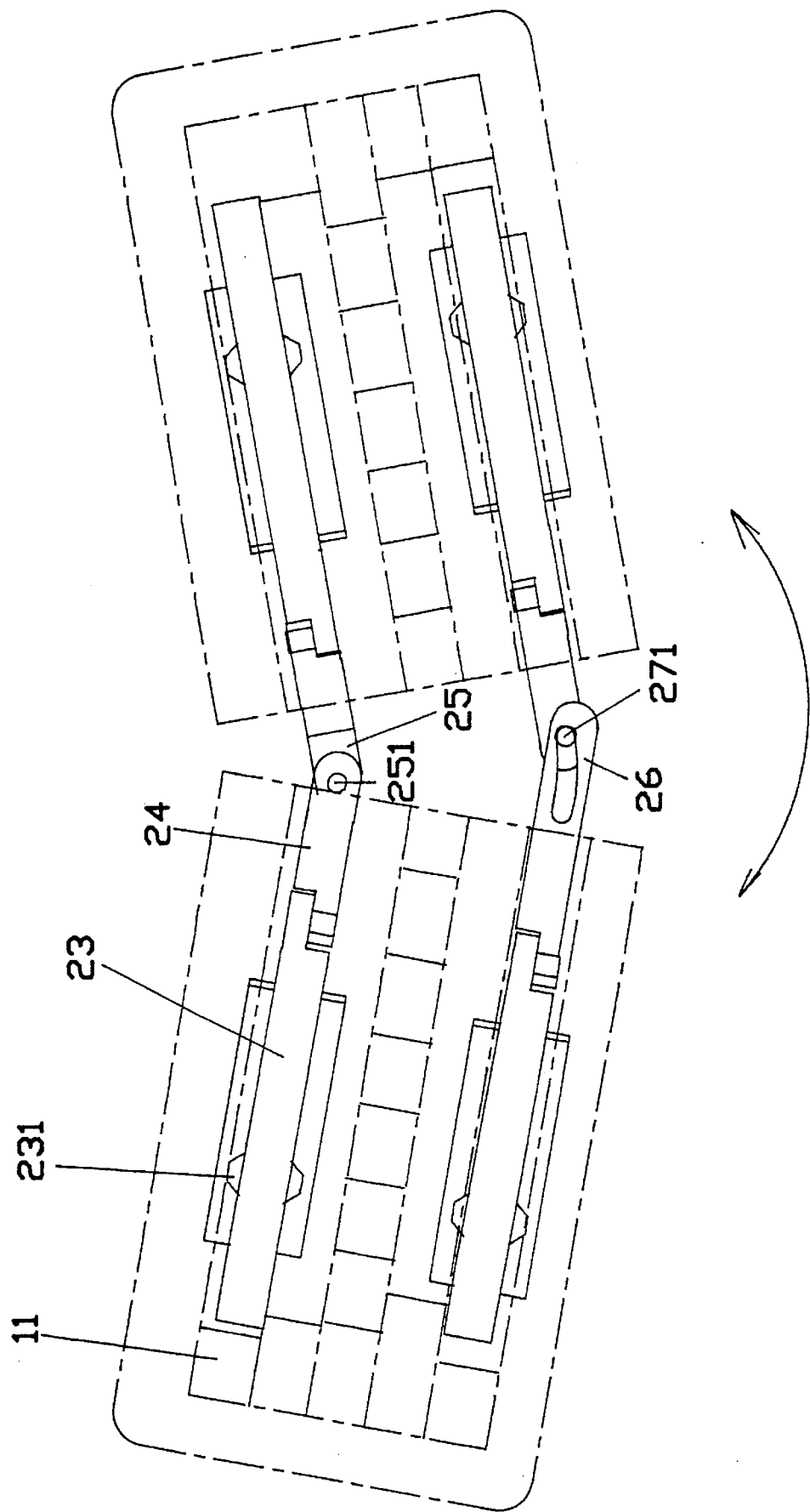
FIG. 6 shows the left and right keyboards of the detachable folding keyboard device of FIG. 1 spread out like a fan.
Figure 7:
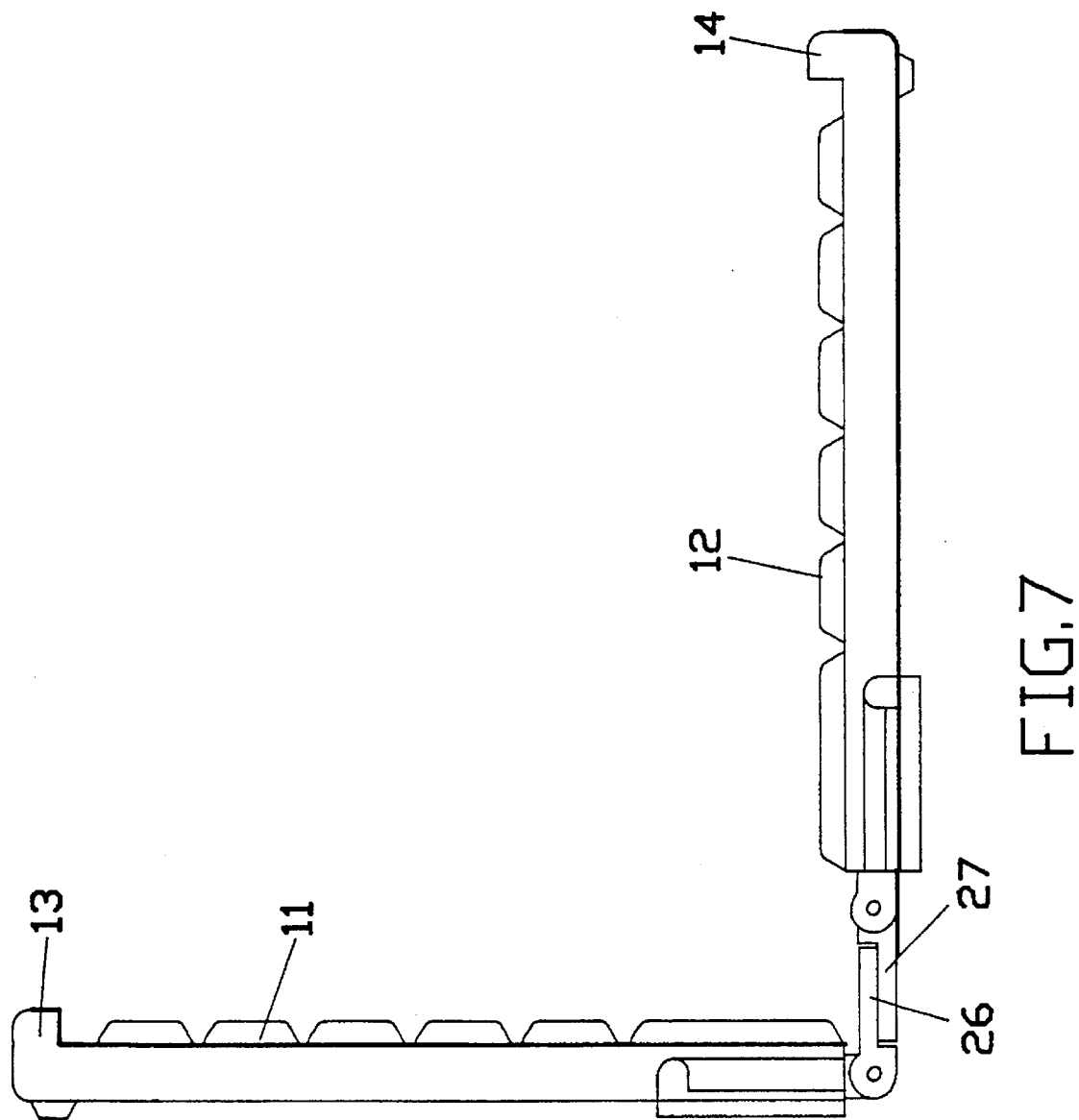
FIG. 7 shows the left and right keyboards of the detachable folding keyboard device of FIG. 1 disposed at right angles.

FIG. 4 shows the detachable folding keyboard device assembled. When assembled, the left keyboard 11 and the right keyboard 12 can be moved apart, as shown in FIG. 5. When the left and right keyboards 11;12 are moved apart, the stub rods 231 of the slide bars 23 are respectively stopped against the respective projecting stop strips 222, and therefore the left and right base frames 21;28 do not disconnect from each other. When the left and right keyboards 11;12 are detached, they can be spread out like a fan (see FIG. 6) by moving the pivot pin 271 from one end of the curved slot 261 to an opposite end thereof. Because the first and third connecting plates 24;26 are respectively hinged to the slide bars 23 on the left base frame 21 and the second and fourth connecting plates 25;27 are respectively hinged to the slide bars 23 on the right base frame 28, the left keyboard 11 and the right keyboard 12 can be folded up and covered over each other (see FIGS. 7, 8, and 9). When the left keyboard 11 and the right keyboard 12 are folded up, the upright rods 13 on the left keyboard 11 are respectively stopped against the upright rods 14 on the right keyboard 12, and the left and right cover plates 31;32 are moved from the respective horizontal positions to the respective vertical position and covered over the left and right keyboards 11;12 at one lateral side.

As indicated, the present invention provides a detachable folding keyboard device which consists of two opposite parts that can be set apart and turned to change the angle relative to each other and that can be folded up when not in use.

While only one embodiment of the present invention has been shown and described, it will be understood that various modifications and changes could be made without departing from the spirit and scope of the invention.

What is claimed is:

1. A detachable folding keyboard device comprising a base frame unit having a left base frame and a right base frame, a keyboard unit having a left keyboard and a right keyboard respectively supported on said left and right base frames, a first connecting device and a second connecting device respectively connected between said left base frame and said right base frame for permitting said left base frame and said right base frame to be moved toward or apart from each other and swung on the same plane relative to each other to change the positions of said left keyboard and said right keyboard relative to each other, or folded up to collapse the keyboard device, wherein said first connecting device comprises a first slide bar made to slide in a first sliding groove on said left base frame at one side, a second slide bar made to slide in a second sliding groove on said right base frame at one side, a first connecting plate having one end hinged to said first slide bar and an opposite end made with a pivot hole, and a second connecting plate having one end made with a pivot pin inserted into the pivot hole on said first connecting plate and an opposite end hinged to said second slide bar; said second connecting device comprises a third slide bar made to slide in a third sliding groove being disposed on said left base frame at a second side in parallel with said first sliding groove, a fourth slide bar made to slide in a fourth sliding groove being disposed on said right base frame at a second side in parallel with said second sliding groove, a third connecting plate having one end hinged to said third slide bar and an opposite end made with an elongated, curved slot, and a fourth connecting plate having one end made with a pivot pin inserted into the curved slot on said third connecting plate and an opposite end hinged to said fourth slide bar.

2. The detachable folding keyboard device of claim 1 further comprising a left cover plate and a right cover plate respectively connected to said left base frame and said right base frame at a bottom at an inner side, each said cover plate comprising two upward bearing walls at opposite ends engaging a sliding rod moved to slide in a slide way on each said base frame.

3. The detachable folding keyboard device of claim 1 wherein said left keyboard and right keyboard have respective upright rods at respective outer corners, the upright rods on said left keyboard being respectively stopped against the upright rods on said right keyboard when the keyboard device is folded up.

\* \* \* \* \*